US006712999B2

(12) United States Patent
Haering et al.

(10) Patent No.: US 6,712,999 B2
(45) Date of Patent: Mar. 30, 2004

(54) ELECTROCHROMIC ELEMENT

(75) Inventors: Jochen Haering, Constance (DE);
Thomas Kraenzler, Salem (DE);
Werner Scherber, Bermatingen (DE);
Horst Weller, Hamburg (DE); Markus Haase, Hamburg (DE); Ulf Zum Felde, Steinkirchen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/937,556

(22) PCT Filed: Mar. 4, 2000

(86) PCT No.: PCT/DE00/00702
§ 371 (c)(1),
(2), (4) Date: Mar. 11, 2002

(87) PCT Pub. No.: WO00/58781
PCT Pub. Date: Oct. 5, 2000

(65) Prior Publication Data
US 2003/0010957 A1 Jan. 16, 2003

(30) Foreign Application Priority Data
Mar. 27, 1999 (DE) .......................... 199 14 093

(51) Int. Cl.[7] .......................... G02F 1/01; G02F 1/15; H01B 1/08; C09D 1/00
(52) U.S. Cl. ................ 252/586; 252/518.1; 252/520.1; 359/248; 359/267
(58) Field of Search ................. 252/586, 587, 252/520.1, 518.1, 515, 516, 519.1, 519.12, 519.14, 519.5, 520.2; 359/248, 254, 267, 265, 274; 428/402

(56) References Cited

U.S. PATENT DOCUMENTS

| | | | |
|---|---|---|---|
| 5,142,406 A | 8/1992 | Lampert et al. | ............ 359/269 |
| 5,274,493 A | * 12/1993 | Couput et al. | ............. 359/275 |
| 5,876,633 A | 3/1999 | Coleman | ................ 252/520.1 |

FOREIGN PATENT DOCUMENTS

| | | | |
|---|---|---|---|
| DE | 3643692 | 3/1992 | |
| DE | 4409470 | 9/1995 | |
| GB | 2081922 | 2/1982 | |
| WO | WO 98/35267 | * 8/1998 | ............. G02F/1/15 |

* cited by examiner

Primary Examiner—Yogendra N. Gupta
Assistant Examiner—Kallambella Vijayakumar
(74) Attorney, Agent, or Firm—Davidson, Davidson & Kappel, LLC

(57) ABSTRACT

The present invention relates to an electrochronic element including the following elements:
an electrode (E1),
an electrochromic functional layer (FS),
an ion-conducting electrolyte (EY)
a layer with high electrical charge capacity (SK),
a counter-electrode (E2), the electrochromic functional layer (FS) being a nanoporous doped semiconductor layer having structure sizes smaller than 50 nm.

19 Claims, 1 Drawing Sheet electrolyte     nanoporous     compact
                layer          electrode electrolyte    nanoporous    compact
               layer         electrode

ELECTROCHROMIC ELEMENT

BACKGROUND OF THE INVENTION

The present invention relates to an electrochromic element.

Electrochromic (EC) elements are at present under discussion for varied applications, for example, for vehicle and building glazings, for mirrors with variable reflectance, in the display technology, etc. In this context, the optical properties of a layer system such as absorptivity, transmissivity and reflectivity are controlled via electrical signals.

A conventional EC system, for example, according to German Patent Applications DE 44 09 470 A1 or DE 36 43 692 A1, is typically composed of a multilayer structure including an electrochromic functional layer, an ion-conducting electrolyte with dissolved salt, and a storage layer which is capable of absorbing or giving off mobile ions. The ion transfer is controlled via large-surface electrodes, at least one electrode being transparent.

A characteristic element of the known systems are special inorganic or organic functional layers which feature a reversible coloring by changing the oxidation state. Examples of electrochromic materials of that kind are the oxides of the transitional metals such as tungsten, niobium, vanadium, titanium, tantalum, nickel, and others, as well as polyaniline, polythiophene, and others. The electrochrornic mechanism of these substances is based on intercalation of mobile ions on interlattice positions of the EC material, resulting in discrete color centers having a material-specific absorption band. To make it easier for the ions to penetrate into the EC material, usually small ions such as lithium or hydrogen (protons) are used.

Moreover, it is a common feature of the known EC materials that they possess both electronic and ionic conductivity. Besides the change in color, this exceptional feature is an indispensable prerequisite for the EC function in the known layer configurations (double charge injection).

The fundamental functional mechanism of the conventional elcctrochromism, the intercalation of mobile ions, limits the performance of such systems with respect to coloring depth, switching speed, and stability. Thus, only a limited number of materials exhibits a technically usable electrochromic effect involving a sufficient coloring in the visible or infrared wavelength ranges. Moreover, a color-neutral coloring can be produced only with limitations, for example, at the cost of the transmission range or the coloring efficiency. High switching speeds, as are required in safety-relevant fields (for example, the windshield of vehicles), are generally not attained due to the ion transfer in the electrochromic layer, in the electrolyte, and in the storage layer, and because of the transfer resistances and adhesion potentials to be overcome in the process.

The most frequently used electrochromic materials such as tungsten oxide or polyaniline are, moreover, difficult to handle in practical use so that the production of stable, reproducible EC elements of high optical quality requires considerable technical outlay and has not been satisfactorily achieved so far.

In document WO 97/23578 and the corresponding U.S. Pat. No. 5,876,633, small highly doped separate particles made of $SnO_2$ are described which permit a more intense electrochromic coloring than compact thin films of $SnO_2$ or solid bodies. In small $SnO_2$ particles of that kind, it is moreover possible to achieve considerably higher doping concentrations (Sb, Nb) so that the charge carrier density is sufficient to partially absorb visible light. Because of this, these particles possess an intrinsic natural color. In document WO 97/23578, a range of 50 nm to 20 micrometers is specified for the particle size. The particles are used, in particular, in electrochromic displays.

Document WO 98/35267 describes an electrochromic display in which a nanoporous semi-conductive metal oxide is used as a carrier for a redox chromophore material whose electrochromic properties are controlled.

U.S. Pat. No. 5,724,187 discloses an electrochromic device whose functional element is composed of an electrochromic film which is optionally doped, for example, for shifting the spectral absorption edge of the base material.

SUMMARY OF THE INVENTION

The object of the present invention is to devise an electrochromic element by means of which considerably shorter switching times and a higher optical switching range (modulation depth) are achieved combined with good color neutrality. Besides, the intention is for the electrochromic element to be manufacturable cost-effectively and in a manner that it has a large surface and a high long-term stability.

According to the present invention, the electrochromic functional layer of the element is a transparent layer which is made of a doped semiconductor and structured in the enanometer range. The layer features structure size in the range smaller than 50 nm. In this context, it is not required for the semiconductor material to be electrochromic in the conventional sense so that very stable base substances can be used.

Suitable for applications in the visible optical spectral range are, for example, tin oxide $SnO_2$, zinc oxide ZnO, cadmium oxide CdO, titanium oxide $TiO_2$, tantalum oxide $Ta_2O_5$ while silicon Si, germanium Ge, zinc selenide ZnSe and others are especially suitable for infrared applications.

By doping such semiconductor materials with foreign atoms, a technologically simple way ensues for the absorptivity of the nanoporous EC layers to be individually adjusted in wide ranges of the visible and infrared wavelength ranges. The operating range of the element according to the present invention can moreover be adjusted to a specific spectral range by adjusting the structure sizes of the electrochromic functional layer.

The regions of the nanoporous functional layer are connected, forming an electrically conductive network which has a large inner surface and which, on one hand, is connected to the electrode in a well-conducting manner and, on the other hand, is in direct contact with the ion-conducting electrolyte. Ideally, the pores are completely filled with electrolytic material.

The change of the optical properties of such a doped nanoporous semiconductor functional layer is effected by applying an electrical field as a result of which the absorptivity of the EC material is either increased or reduced, depending on the polarity. The energetic position of the maximum absorption range or transmission range lies within the visible or in the infrared wavelength range, depending on the degree of doping and the structure sizes, and can amount to up to 75%.

Unlike conventional EC elements, in which discrete color centers are produced in the electrochromic material by intercalation of small ions (hydrogen or lithium), in the case of the EC element according to the present invention, a change of the optical properties of is achieved only by accumulation of mobile ions on the boundary surface of the functional layer. Thus, an electrochromic effect is also achieved with large ions.

The use of doped tin oxide $SnO_2$ as the material for the electrochromic functional layer is of outstanding significance since the tin oxide constitutes the preferred material for transparent electrodes due to its chemical stability and high electric conductivity. Thus, it is possible to prepare the EC functional layer and the electrode from the same base material. The electrode itself, however, needs not to have the nanostructuring according to the present invention.

The electrochromic functional layer can be manufactured in a particularly advantageous manner from a colloidal solution of dispersed nanoparticles which are composed of a doped semiconductor material and have a particle size smaller than 50 nm.

In this context, the functional layer can be obtained from the colloidal solution, in particular, by spin coating, by sol-gel dip coating, or by a spray pyrolysis method, including a subsequent heat treatment.

Alternatively, the functional layer can be manufactured using an electrochemical method such as porous etching or porous anodization of metals.

A further suitable method for manufacturing the functional layer is the coating with a nanostructured mask which is selectively removed later.

The advantage of the present invention lies above all in that the functional layers which are nanostructured according to the present invention make it possible to attain strong electrochromic effects such as a high transmission range. In this context, the switching times are considerably shorted than with the known electrochrornic elements. Moreover, the manufacture of electrochromic cells can be considerably simplified.

BRIEF DESCRIPTION OF THE DRAWINGS

In the following, the present invention will be explained in greater detail in the light of drawings.

DETAILED DESCRIPTION OF A PREFERRED EMBODIMENT

Figure 1:
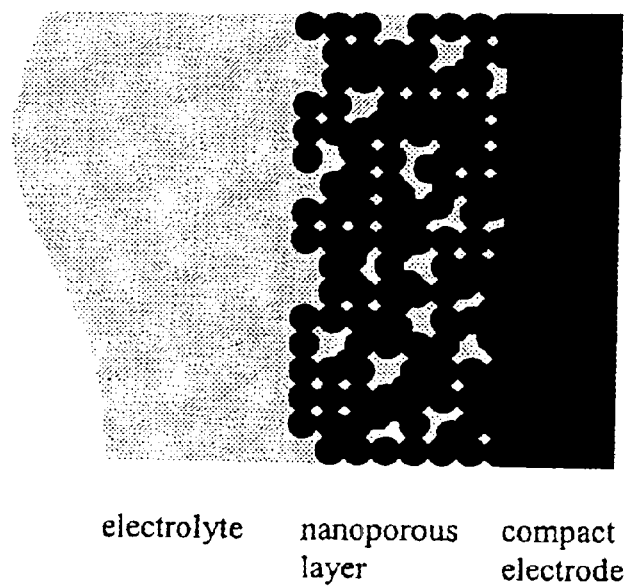
FIG. 1 shows a sketch regarding the structure of the electrochromic functional layer according to the present invention.

FIG. 1 shows a sketch regarding the structure of the electrochromic functional layer according to the present invention within an electrochromic element. The functional layer is structured in the nanometer range, namely in such a manner that its structural elements are smaller than 50 nm. The functional layer has a large inner surface and is connected to the adjacent compact electrode in a well-conducting manner. Moreover, it is in direct contact with the ion-conducting electrolyte. It is preferred for the pores of the functional layer to be completely filled with the electrolyte.

Figure 2:
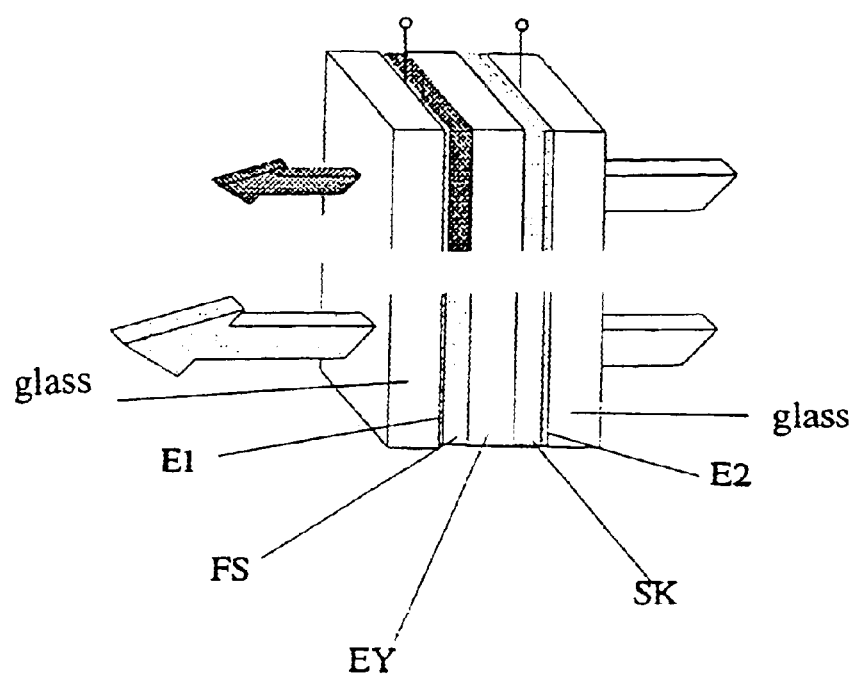
FIG. 2 shows an electrochromic element according to the present invention.

FIG. 2 shows an electrochromic element according to the present invention in the embodiment as building or vehicle glazing featuring the following laminate structure:

glass pane G1
transparent electrode E1
electrochromic functional layer FS
ion-conducting electrolyte EY
layer with high electrical charge capacity SK
transparent counter-electrode E2
glass pane G2.

Here, the representation is symbolically divided into a lower half and an upper half, corresponding to the different switching states of electrochromic functional layer FS. In the lower half, the element has a high radiation transmittance (recognizable by the large exiting arrow), in the upper half the element has a low radiation transmittance (recogtizable by the small exiting arrow).

The two compact electrodes E1, E2, for example, made of doped $SnO_2$ are used for electrically controlling the optical properties of the element. The term 'compact' is used here for purpose of delimitation with respect to the nanoporous structure of functional layer FS. Nanoporous electrochromic functional layer FS, which is composed of a doped semiconductor material, exists adjacent to the first electrode. Usable as semiconductor material is, for example, a semi-conductive oxide of the elements tin, zinc, cadmium, indium, titanium, tantalum, niobium, etc. or silicon, germanium, gallium arsenide, silicon carbide, indium phosphide, cadmium sulfide, zinc selenide, etc. Depending on the operating point, these semiconductors are doped in a concentration x, x being greater than 0 and less than or equal to 30 mol %. Usable as dopants are metals as, for example, antimony, niobium, vanadium, tin, aluminum, or a halogen as, for instance, fluorine, chlorine, bromine, or iodine.

Counter-electrode E2 is arranged adjacent to layer SK with high electrical charge capacity. Like functional layer FS, this layer SK can be a transparent nanostructured semiconductor layer whose doping is adjusted in such a manner that it just does not show any electrochrornic effect. A conventional ion storage layer (for example, $Ce_xTi_yO_z$, $Ni_xO_y$, $V_xO_y$, polyaniline or polyethylene dioxythiophene) for reversibly absorbing mobile ions by means of intercalation on interlattice positions can alternatively be used as well. The coupling of the overall system is via an ion-conducting eleyctrolyte EY which fills the nanopores of EC functional layer FS and, possibly, the nanopores of layer SK with high electrical charge capacity. In this context, it is essential for the nanoporous structure to be wetted with the electrolyte as completely as possible, which can be achieved, for example, by filling the pores under vacuum conditions. Usable as electrolyte are, for example, water, an alcohol, propylene carbonate, propylene glycol, a anhydrous phosphoric acid or sulfonated PAEK.

In another embodiment not shown here, in which the element according to the present invention is not used as a glazing element but as a controllable mirror, a reflecting layer must exist which can be arranged within or outside the layer system. In the case of such an embodiment, one electrode E1 or E2 can advantageously be designed as a reflecting metal film. The opposite electrode has a transparent design.

In the following, the manufacture of the EC functional layer according to the present invention will be explained in the light of examples:

EXAMPLE 1

Spincoating

The basis for the manufacture is a colloidal solution of monodisperse semiconductor nanoparticles which are doped to a different degree, depending on the application area. In the following, this will be exemplarily described by the example of tin dioxide doped with antimony:

Tin chloride is dissolved in water and concentrated hydrochloric acid is added to obtain clear solutions. For the doping with antimony, antimony chloride is dissolved in concentrated hydrochloric acid. For an optimum coloring efficiency, the mole fraction $x=n_{Sb}/(n_{Sb}+n_{Sb})$ is between $x=0.1$ and 0.3, preferably at $x=0.20-0.25$. This solution is dripped into the tin chloride solution under intensive agitation. This transparent acid solution with brought to a pH value of 3–8 by adding ammonia. The voluminous precipitate forming in the process is centrifuged and repeatedly washed with water until the precipitate goes colloidally into solution after prolonged agitation. This colloidal solution featuring particle sizes of 2–3 nm is subsequently dialyzed free of chloride, boiled down at the rotary film evaporator, filtered, and stabilized. Such colloidal solutions are transparent and have a yellow to reddish color, depending on the doping with antimony. Undoped colloidal tin dioxide solutions are colorless.

Subsequently, glycerol is added to these chloride-free colloidal solutions which are then boiled down at a rotary film evaporator. The solution, which gels as it cools off, reconverts to a slightly viscous liquid subsequent to adding a concentrated ammonia solution and treatment in an ultrasonic bath. After filtration, this solution is applied to a quickly rotating substrate via the spincoating method and is compacted and oven-hardened at temperatures T>200° C. Depending on the desired layer thickness, this process can be repeated several times. The result is transparent nanoporous $SnO_2$ layers having a degree of doping of up to 30 mole percent of antimony and structure sizes in the range of 3–10 mm.

EXAMPLE 2

Sol-gel Dip Coating Method

The manufacture of nanoporous semiconductor functional layers via a sol-gel method will be exemplarily explained on the basis of doped tin dioxide $SnO_2$:

The synthesis of colloidal doped $SnO_2$ solutions for dip coating corresponds to the above described procedure up to the preparation of chloride-free solutions.

A homogenous coating of glass or other oxidic substrates requires a change to alcoholic solvents. To this end, the water-washed precipitate is initially washed with 2-propanol and, subsequent to adding a solution of $(BU_4N)OH$ in methanol, is diluted with 2-propanol. Under intensive agitation, a colloidal solution is obtained which is composed of dispersed $SnO_2$ nanoparticles having a diameter of 2–3 nm. The substrate is drawn from such an alcoholic colloidal solution at a constant speed and, subsequent to a drying conditioning step, is tempered and compacted in the oven. This procedure can be repeated several times for manufacturing thick and transparent $SnO_2$ coatings. As a result, doped nanoporous functional layers are obtained which feature structure sizes of 3–10 nm, depending on the tempering temperature.

EXAMPLE 3

Spray Pyrolysis

For manufacturing doped nanoporous semiconductor functional layers in the spray pyrolysis method, colloidal solutions are used as were exemplarily described in example 1 and example 2 on the basis of doped $SnO_2$. During the coating process, the substrate is heated to temperatures between 200 and 800° C., and the colloidal solution is sprayed thereon. On the hot substrate surface, the solvent vaporizes and the semiconductor nanoparticles cross-link to form a porous functional layer.

EXAMPLE 4

Electrochemical Etching Processes

Nanoporous semiconductor structures such as silicon Si, silicon carbide SiC, gallium arsenide GaAs, indium phosphide InP, gallium phosphide GaP, germanium Ge, tin oxide $SnO_2$ and cadmium selenide CdSe can be manufactured via an electrochemical etching process in acidic electrolytes. In the process, the semiconductor materials which are intrinsically inert against the used acids are dissolved as a result of a redox reaction by providing positive charge carriers at the boundary surface. The fundamental condition for the formation of a porous structure, is a passive state of the pore walls and an active state at the pore bottom which supports the pore formation. This can be achieved by a degree of doping of the semiconductor or via a suitable electrolyte composition.

In the following, the experimental procedure will be exemplarily described on the basis of porous silicon.

Silicon is made porous by etching in electrolytes containing hydrofluoric acid with HF concentrations of 1–50% by applying an electrical potential at current intensities of 0–300 mA/cm$^2$. In this context, the microstructure of the pores is dependent on the degree of doping of the semiconductor, and can amount to between 2 nm and several micrometers pore wall thickness. The porosity can be adjusted between 40–80% via the ratio of current intensity and electrolyte concentration. The optimum doping for an electrochromic element can be adapted by later thermal interdiffusion.

EXAMPLE 5

Masking Techniques

A porous semiconductor nanostructure can be produced by the coating of a nanostructured mask which is later removed subsequent to the completion of the functional layer. Such a nanostructured mask can be composed, inter alia, of aluminum oxide made porous by anodization, it being possible for the regular pore structure of the aluminum oxide to be adjusted to structure size of 5–500 nm, depending on the preparation conditions. This aluminum oxide mask can be coated with the doped semiconductor material by dip coating via the sol-gel method including a subsequent high-temperature tempering step, and later be selectively etched in a wet-chemical manner.

An alternative approach consists in template structures made of latex particles in the size range of 5–5000 nm. When using a sol-gel process for coating the regular latex structure with the semiconductor, this regularly arranged matrix vaporizes during the high-temperature tempering step so that a nanoporous functional layer is obtained in this manner as well.

Possible uses of the EC element according to the present invention not only include those of the conventional electrochromism but go far beyond. This previous applications lie in the fields of vehicle and building glazings with controllable transmission, switchable mirrors (for example, dimmable mirrors, in particular for motor vehicles) as well as displays. While the conventional EC systems which have been known for many years could hardly establish themselves on the market so far for the above mentioned reasons, the elements according to the present invention promise decisive advantages for a technical implementation due to their stability, their optical quality, and the simple producibility.

Moreover, new applications can be found due to the specific features of the element according to the present invention. Thus, for instance, safety-relevant fields such as the front glazing of motor vehicles, rail vehicles, aircraft, and the like, are conceivable only via fast-switching glass elements. To date, even in the case of the side-window panes of passenger cars it is unclear whether conventional EC panes having switching times of approximately one minute are able to fulfill the conditions to be permitted by law.

An interesting application potential of the present invention lies also in the field of display technology. Provided that other features such as costs and durability were given, conventional EC systems would initially be usable only for static displays, for example, as information panels at airports and railroad stations, price signs at gas stations or in the field of poster display advertising. EC systems having switching times of approximately one second could be used in the entire sector of instrument displays in vehicles, for new kinds of image-forming methods for driver information systems, for traffic routing systems or for timepiece displays. Moreover, the possibility of color-neutral darkening in conjunction with switching times of less than 100 or 10 ms constitute the principal condition for the implementation of flat, lightweight color displays featuring segment or matrix control as an alternative to the known systems which are based on liquid crystals. Potential advantages of EC displays in comparison with LC displays cannot be conclusively assessed today but presumably consist in the larger aspect angle range, in the contrast range, as well as in the manufacturing technology (all solid state device).

A further advantage of the EC systems according to the present invention lies in the variability of the spectral operating range of the semiconductor functional layer which, as a general principle, is not possible when using classical EC materials. There, for each spectral range and for each color location, a specific functional material is to be defined and to be optimized, mostly in a complex manner in the interplay with the overall cell. In the new kind of EC functional mechanism of the EC element according to the present invention, the energetic position of the absorption bands can be shifted in large regions of the spectral range without significantly modifying the remaining components of the system.

Specific applications in the infrared ensue, for example, in military camouflage. As is generally known, characteristic bands of the vegetation lie in the near infrared (NIR) so that it is of decisive tactical importance if a vehicle is able to adapt itself to the specific background in the case of changing environmental conditions or during the summer/winter transition by controlling its NIR reflectivity. Even more interesting is a corresponding adaptation in the thermal infrared TIR, i.e., in the range of the 'third atmospheric window' at a wavelength of approximately 8 to 12 micrometers. Since this is the spectral range in which the reconnaissance is carried out with powerful thermal image devices which can identify objects exclusively but very sensitively on the basis of their temperature differences with respect to the environment, efforts have been made for quite a long time to manipulate the apparent temperature of the object and to adapt it to the constantly changing operating temperatures and to the environmental and weather conditions of the scene via the controlled adjustment of the TIR absorptance or heat emittance of the surface. Although, in principle, proposals for attaining the object exist for these applications, no practically usable 'electroemissive' or 'electroreflective' systems for the IR range have been introduced so far, mainly for reasons of stability.

A similar situation exists in the possible use of TIR-EC systems for the thermal control of spacecraft. According to the related art, each spacecraft is thermostated in a conventional manner with the aid of movable screens, heat pipes, electrical heaters powered by solar cells, or the like. Here, the use of reliably working electroemissive elements would result in important savings in weight and costs and, moreover, reduce the variations in temperature of the entire spacecraft so that mechanical, optical and electronic components of simpler quality could be used, which, in turn, would further reduce the total cost of the system.

What is claimed is:

1. An electrochromic element, comprising
    an electrode,
    an electrochromic functional layer,
    an ion-conducting electrolyte,
    a layer with high electrical charge capacity, and
    a counter-electrode,
    the electrochromic functional layer being exclusively composed of a doped semiconductor layer having structure sizes smaller than 50 nm, having nanopores and forming a connected, electrically conductive network, the ion-conducting electrolyte filling the nanopores of the electrochromic functional layer.

2. The electrochromic element as recited in claim 1 wherein the electrochromic functional layer is composed of a semi-conductive oxide of the elements tin, zinc, cadmium, indium, titanium, tantalum, or niobium, or is composed of silicon, germanium, gallium arsenide, silicon carbide, indium phosphide, cadmium sulfide, or zinc selenide.

3. The electrochromic element as recited in claim 1 wherein the electrochromic functional layer is doped with a doping concentration x, x being greater than zero and less than or equal to 30 mol %.

4. The electrochromic element as recited in claim 1 wherein the dopant for the electrochromic functional layer is a metal.

5. The electrochromic element as recited in claim 4 wherein the metal is antimony, niobium, vanadium, tin, or aluminum.

6. The electrochromic element as recited in claim 1 wherein the dopant for the electrochromic functional layer is a halogen.

7. The electrochromic element as recited in claim 1 wherein the layer with high electrical charge capacity is a nanoporous doped semiconductor layer having structure sizes smaller than 50 nm, with a level of dopant such that the layer with high electrical charge capacity has neutral, non-electrochromic behavior.

8. The electrochromic element as recited in claim 1 wherein the layer with high electrical charge capacity is an ion storage layer.

9. The electrochromic element as recited in claim 1 wherein the ion storage layer is selected from $Ce_xTi_yO_z$, $Ni_xO_y$, $V_xO_y$, polyaniline or polyethylene dioxythiophene.

10. The electrochromic element as recited in claim 1 wherein one of the electrode and the counter-electrode is a reflecting metal layer.

11. The electrochromic element as recited in claim 1 wherein at least one of the two electrodes is transparent.

12. The electrochromic element as recited in claim 1 wherein an operating range of the electrochromic element is in the visible optical spectral range or to the near or thermal infrared spectral range as a result of at least one of doping the electrochromic functional layer and varying the structure sizes of the electrochromic functional layer.

13. An electrochromic element as recited in claim 1 for military camouflage in the infrared wavelength range.

14. An electrochromic element as recited in claim 1 for the thermal control of spacecraft in the wavelength range of the thermal infrared.

15. A method for manufacturing an electrochromic functional layer exclusively composed of a doped semiconductor layer having, structure sizes smaller than 50 nm, having nanopores and forming a connected, electrically conductive network, comprising the step of:
   obtaining the functional layer from a colloidal solution of dispersed nanoparticles composed of a doped semiconductor material and having a particle size smaller than 50 nm.

16. The method for manufacturing an electrochromic functional layer as recited in claim 15 wherein the functional layer is obtained from the colloidal solution by spincoating, by sol-gel dip coating or by a spray pyrolysis method, including a subsequent heat treatment.

17. A method for manufacturing an electrochromic functional layer exclusively composed of a doped semiconductor layer having structure sizes smaller than 50 nm, having nanopores and forming a connected, electrically conductive network, comprising the step of:
   using an electrochemical method to obtain the electrochromic functional layer.

18. The method as recited in claim 17, wherein the electrochemical method includes porous etching or porous anodization of metals.

19. A method for manufacturing an electrochromic functional layer exclusively composed of a doped semiconductor layer having structure sizes smaller than 50 nm, having nanopores and forming a connected, electrically conductive network, comprising the step of:
   using a coating with a nanostructured mask which is selectively removed later.

* * * * *